(12) United States Patent
Shokrollahi et al.

(10) Patent No.: US 9,674,014 B2
(45) Date of Patent: Jun. 6, 2017

(54) METHOD AND APPARATUS FOR HIGH SPEED CHIP-TO-CHIP COMMUNICATIONS

(71) Applicant: Kandou Labs, S.A., Lausanne (CH)

(72) Inventors: Amin Shokrollahi, Preverenges (CH); Roger Ulrich, Bern (CH)

(73) Assignee: KANDOU LABS, S.A. (CH)

( * ) Notice: Subject to any disclaimer, the term of this patent is extended or adjusted under 35 U.S.C. 154(b) by 23 days.

(21) Appl. No.: 14/920,762

(22) Filed: Oct. 22, 2015

(65) Prior Publication Data

US 2016/0119118 A1  Apr. 28, 2016

Related U.S. Application Data

(60) Provisional application No. 62/067,430, filed on Oct. 22, 2014.

(51) Int. Cl.
*H04L 7/033* (2006.01)
*H04L 25/49* (2006.01)
*H04L 25/02* (2006.01)

(52) U.S. Cl.
CPC .......... *H04L 25/49* (2013.01); *H04L 25/0276* (2013.01)

(58) Field of Classification Search
None
See application file for complete search history.

(56) References Cited

U.S. PATENT DOCUMENTS

| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |

(Continued)

FOREIGN PATENT DOCUMENTS

| CN | 101478286 | 7/2009 |
| JP | 03163612 | 6/2003 |

(Continued)

OTHER PUBLICATIONS

Abbasfar, A., "Generalized Differential Vector Signaling", IEEE International Conference on Communications, ICC '09, (Jun. 14, 2009), pp. 1-5.

(Continued)

*Primary Examiner* — Kevin M Burd
(74) *Attorney, Agent, or Firm* — Invention Mine LLC

(57) ABSTRACT

Described herein are systems and methods of receiving first and second input signals at a first two-input comparator, responsively generating a first subchannel output, receiving third and fourth input signals at a second two-input comparator, responsively generating a second subchannel output, receiving the first, second, third, and fourth input signals at a third multi-input comparator, responsively generating a third subchannel output representing a comparison of an average of the first and second input signals to an average of the third and fourth input signals, configuring a first data detector connected to the second subchannel output and a second data detector connected to the third subchannel output according to a legacy mode of operation and a P4 mode of operation.

20 Claims, 16 Drawing Sheets

(56) References Cited

U.S. PATENT DOCUMENTS

| | | |
|---|---|---|
| 4,486,739 A | 12/1984 | Franaszek |
| 4,499,550 A | 2/1985 | Ray, III |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,053,974 A | 10/1991 | Penz |
| 5,166,956 A | 11/1992 | Baltus |
| 5,168,509 A | 12/1992 | Nakamura |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,995,016 A | 11/1999 | Perino |
| 5,999,016 A | 12/1999 | McClintock |
| 6,005,895 A | 12/1999 | Perino |
| 6,084,883 A | 7/2000 | Norrell |
| 6,119,263 A | 9/2000 | Mowbray |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino |
| 6,378,073 B1 | 4/2002 | Davis |
| 6,398,359 B1 | 6/2002 | Silverbrook |
| 6,404,820 B1 | 6/2002 | Postol |
| 6,417,737 B1 | 7/2002 | Moloudi |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,686,879 B2 | 2/2004 | Shattil |
| 6,766,342 B2 | 7/2004 | Kechriotis |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,999,516 B1 | 2/2006 | Rajan |
| 7,023,817 B2 | 4/2006 | Kuffner |
| 7,053,802 B2 | 5/2006 | Cornelius |
| 7,075,996 B2 | 7/2006 | Simon |
| 7,085,153 B2 | 8/2006 | Ferrant |
| 7,085,336 B2 | 8/2006 | Lee |
| 7,130,944 B2 | 10/2006 | Perino |
| 7,142,612 B2 | 11/2006 | Horowitz |
| 7,142,865 B2 | 11/2006 | Tsai |
| 7,164,631 B2 | 1/2007 | Tateishi |
| 7,167,019 B2 | 1/2007 | Broyde |
| 7,180,949 B2 | 2/2007 | Kleveland |
| 7,184,483 B2 | 2/2007 | Rajan |
| 7,269,212 B1 | 9/2007 | Chau |
| 7,335,976 B2 | 2/2008 | Chen |
| 7,339,990 B2 | 3/2008 | Hidaka |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,370,264 B2 | 5/2008 | Worley |
| 7,372,390 B2 | 5/2008 | Yamada |
| 7,389,333 B2 | 6/2008 | Moore |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,535,957 B2 | 5/2009 | Ozawa |
| 7,570,704 B2 | 8/2009 | Nagarajan |
| 7,599,390 B2 | 10/2009 | Pamarti |
| 7,616,075 B2 | 11/2009 | Kushiyama |
| 7,620,116 B2 | 11/2009 | Bessios |
| 7,633,850 B2 | 12/2009 | Ahn |
| 7,639,596 B2 | 12/2009 | Cioffi |
| 7,643,588 B2 | 1/2010 | Visalli |
| 7,656,321 B2 | 2/2010 | Wang |
| 7,694,204 B2 | 4/2010 | Schmidt |
| 7,697,915 B2 | 4/2010 | Behzad |
| 7,706,456 B2 | 4/2010 | Laroia |
| 7,706,524 B2 | 4/2010 | Zerbe |
| 7,746,764 B2 | 6/2010 | Rawlins |
| 7,787,572 B2 | 8/2010 | Scharf |
| 7,804,361 B2 | 9/2010 | Lim |
| 7,808,883 B2 | 10/2010 | Green |
| 7,841,909 B2 | 11/2010 | Murray |
| 7,869,497 B2 | 1/2011 | Benvenuto |
| 7,869,546 B2 | 1/2011 | Tsai |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,030,999 B2 | 10/2011 | Chatterjee |
| 8,036,300 B2 | 10/2011 | Evans |
| 8,050,332 B2 | 11/2011 | Chung |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,180,931 B2 | 5/2012 | Lee |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,245,094 B2 | 8/2012 | Jiang |
| 8,253,454 B2 | 8/2012 | Lin |
| 8,279,094 B2 | 10/2012 | Abbasfar |
| 8,295,250 B2 | 10/2012 | Gorokhov |
| 8,310,389 B1 | 11/2012 | Chui |
| 8,365,035 B2 | 1/2013 | Hara |
| 8,406,315 B2 | 3/2013 | Tsai |
| 8,429,492 B2 | 4/2013 | Yoon |

(56) References Cited

U.S. PATENT DOCUMENTS

| | | |
|---|---|---|
| 8,429,495 B2 | 4/2013 | Przybylski |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,638,241 B2 | 1/2014 | Sudhakaran |
| 8,649,445 B2 | 2/2014 | Cronie |
| 8,649,460 B2 | 2/2014 | Ware |
| 8,649,556 B2 | 2/2014 | Wedge |
| 8,649,840 B2 | 2/2014 | Sheppard, Jr. |
| 8,687,968 B2 | 4/2014 | Nosaka |
| 8,711,919 B2 | 4/2014 | Kumar |
| 8,718,184 B1 | 5/2014 | Cronie |
| 8,773,964 B2 | 7/2014 | Hsueh |
| 8,780,687 B2 | 7/2014 | Clausen |
| 8,782,578 B2 | 7/2014 | Tell |
| 8,831,440 B2 | 9/2014 | Yu |
| 8,879,660 B1 | 11/2014 | Peng |
| 8,897,134 B2 | 11/2014 | Kern |
| 8,949,693 B2 | 2/2015 | Ordentlich |
| 8,951,072 B2 | 2/2015 | Hashim |
| 8,975,948 B2 | 3/2015 | GonzalezDiaz |
| 8,989,317 B1 | 3/2015 | Holden |
| 9,015,566 B2 | 4/2015 | Cronie |
| 9,020,049 B2 | 4/2015 | Schwager |
| 9,036,764 B1 | 5/2015 | Hossain |
| 9,069,995 B1 | 6/2015 | Cronie |
| 9,077,386 B1 | 7/2015 | Holden |
| 9,093,791 B2 | 7/2015 | Liang |
| 9,100,232 B1 * | 8/2015 | Hormati ............ H04L 25/03343 |
| 9,106,465 B2 | 8/2015 | Walter |
| 9,124,557 B2 | 9/2015 | Fox |
| 9,152,495 B2 | 10/2015 | Losh |
| 9,165,615 B2 | 10/2015 | Amirkhany |
| 9,172,412 B2 | 10/2015 | Kim |
| 9,183,085 B1 | 11/2015 | Northcott |
| 9,197,470 B2 | 11/2015 | Okunev |
| 9,281,785 B2 | 3/2016 | Sjoland |
| 9,331,962 B2 | 5/2016 | Lida |
| 9,362,974 B2 | 6/2016 | Fox |
| 9,363,114 B2 | 6/2016 | Shokrollahi |
| 9,374,250 B1 | 6/2016 | Musah |
| 2002/0044316 A1 | 4/2002 | Myers |
| 2002/0057292 A1 | 5/2002 | Holtz |
| 2002/0057592 A1 | 5/2002 | Robb |
| 2002/0154633 A1 | 10/2002 | Shin |
| 2002/0174373 A1 | 11/2002 | Chang |
| 2003/0086366 A1 | 5/2003 | Branlund |
| 2003/0146783 A1 | 8/2003 | Bandy |
| 2005/0174841 A1 | 8/2005 | Ho |
| 2005/0213686 A1 | 9/2005 | Love |
| 2006/0126751 A1 | 6/2006 | Bessios |
| 2007/0194848 A1 | 8/2007 | Bardsley |
| 2007/0263711 A1 | 11/2007 | TheodorKramer |
| 2007/0265533 A1 | 11/2007 | Tran |
| 2008/0007367 A1 | 1/2008 | Kim |
| 2008/0013622 A1 | 1/2008 | Bao |
| 2008/0104374 A1 | 5/2008 | Mohamed |
| 2008/0159448 A1 | 7/2008 | Anim-Appiah |
| 2008/0317188 A1 | 12/2008 | Staszewski |
| 2009/0059782 A1 | 3/2009 | Cole |
| 2009/0228767 A1 | 9/2009 | Oh |
| 2009/0251222 A1 | 10/2009 | Khorram |
| 2010/0023838 A1 | 1/2010 | Shen |
| 2010/0046644 A1 | 2/2010 | Mazet |
| 2010/0180143 A1 | 7/2010 | Ware |
| 2010/0215112 A1 | 8/2010 | Tsai |
| 2010/0296556 A1 | 11/2010 | Rave |
| 2011/0072330 A1 | 3/2011 | Kolze |
| 2011/0150495 A1 | 6/2011 | Nosaka |
| 2011/0291758 A1 | 12/2011 | Hsieh |
| 2011/0299555 A1 | 12/2011 | Cronie |
| 2012/0008662 A1 | 1/2012 | Gardiner |
| 2012/0152901 A1 | 6/2012 | Nagorny |
| 2012/0161945 A1 | 6/2012 | Single |
| 2013/0010892 A1 | 1/2013 | Cronie |
| 2013/0049863 A1 | 2/2013 | Chiu |
| 2013/0195155 A1 | 8/2013 | Pan |
| 2013/0229294 A1 | 9/2013 | Matsuno |
| 2014/0198841 A1 | 7/2014 | George |
| 2014/0226455 A1 | 8/2014 | Schumacher |
| 2015/0010044 A1 | 1/2015 | Zhang |
| 2015/0078479 A1 | 3/2015 | Whitby-Strevens |
| 2015/0146771 A1 | 5/2015 | Walter |
| 2015/0199543 A1 | 7/2015 | Winoto |
| 2015/0222458 A1 | 8/2015 | Hormati |
| 2015/0249559 A1 | 9/2015 | Shokrollahi |
| 2015/0333940 A1 | 11/2015 | Shokrollahi |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |

FOREIGN PATENT DOCUMENTS

| | | |
|---|---|---|
| WO | 2009084121 | 7/2009 |
| WO | 2010031824 | 3/2010 |
| WO | 2011119359 | 9/2011 |
| WO | 2039221 | 2/2013 |

OTHER PUBLICATIONS

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

Clayton, P., "Introduction to Electromagnetic Compatibility", Wiley-Interscience, 2006.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Healey, A., et al., "A Comparison of 25 Gbps NRZ & PAM-4 Modulation used in Legacy & Premium Backplane Channels", DesignCon 2012, 16 pages.

International Search Report and Written Opinion for PCT/EP2011/059279 mailed Sep. 22, 2011.

International Search Report and Written Opinion for PCT/EP2011/074219 mailed Jul. 4, 2012.

International Search Report and Written Opinion for PCT/EP2012/052767 mailed May 11, 2012.

International Search Report and Written Opinion for PCT/US14/052986 mailed Nov. 24, 2014.

International Search Report and Written Opinion from PCT/US2014/034220 mailed Aug. 21, 2014.

(56) References Cited

OTHER PUBLICATIONS

International Search Report and Written Opinion of the International Searching Authority, mailed Jul. 14, 2011 in International Patent Application S.N. PCT/EP2011/002170, 10 pages.
International Search Report and Written Opinion of the International Searching Authority, mailed Nov. 5, 2012, in International Patent Application S.N. PCT/EP2012/052767, 7 pages.
International Search Report for PCT/US2014/053563, dated Nov. 11, 2014, 2 pages.
Notification of Transmittal of the International Search Report and The Written Opinion of the International Searching Authority, or the Declaration for PCT/EP2013/002681, dated Feb. 25, 2014, 15 pages.
Poulton, et al., "Multiwire Differential Signaling", UNC-CH Department of Computer Science Version 1.1, Aug. 6, 2003.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Skliar et al., A Method for the Analysis of Signals: the Square-Wave Method, Mar. 2008, Revista de Matematica: Teoria y Aplicationes, pp. 109-129.
Slepian, D., "Premutation Modulation", IEEE, vol. 52, No. 3, Mar. 1965, pp. 228-236.
Stan, M., et al., "Bus-Invert Coding for Low-Power I/O, IEEE Transactions on Very Large Scale Integration (VLSI) Systems", vol. 3, No. 1, Mar. 1995, pp. 49-58.
Tallini, L., et al., "Transmission Time Analysis for the Parallel Asynchronous Communication Scheme", IEEE Transactions on Computers, vol. 52, No. 5, May 2003, pp. 558-571.
Wang et al., "Applying CDMA Technique to Network-on-Chip", IEEE Transactions on Very Large Scale Integration (VLSI) Systems, vol. 15, No. 10 (Oct. 1, 2007), pp. 1091-1100.
"Introduction to: Analog Computers and the DSPACE System," Course Material ECE 5230 Spring 2008, Utah State University, www.coursehero.com, 12 pages.
Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pages, http.//www.retrothing.com/2006/08/classic_analog_.html.
Jiang, A., et al., "Rank Modulation for Flash Memories", IEEE Transactions of Information Theory, Jun. 2006, vol. 55, No. 6, pp. 2659-2673.
Loh, M., et al., "3x9 Gb/s Shared, All-Digital CDR for High-Speed, High-Density I/O", Matthew Loh, IEEE Journal of Solid-State Circuits, Vo. 47, No. 3, Mar. 2012.
Notification of Transmittal of the International Search Report and The Written Opinion of the International Searching Authority, for PCT/US2015/018363, mailed Jun. 18, 2015, 13 pages.
Notification of Transmittal of the International Search Report and The Written Opinion of the International Searching Authority, or the Declaration, dated Mar. 3, 2015, for PCT/US2014/066893, 9 pages.
Notification of Transmittal of the International Search Report and The Written Opinion of the International Searching Authority, or the Declaration, for PCT/US2014/015840, dated May 20, 2014. 11 pages.
Notification of Transmittal of the International Search Report and The Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and The Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015.
Notification of Transmittal of the International Search Report and the Written Opinion of the International Searching Authority, or the Declaration, for PCT/US2015/043463, dated Oct. 16, 2015, 8 pages.
Oh, et al., Pseudo-Differential Vector Signaling for Noise Reduction in Single-Ended Signaling, DesignCon 2009.
Schneider, J., et al., "ELEC301 Project: Building an Analog Computer," Dec. 19, 1999, 8 pages, http://www.clear.rice.edu/elec301/Projects99/anlgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Zouhair Ben-Neticha et al, "The streTched—Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

* cited by examiner

Mix [ 1/2 -1 1/2 ]

CML with EQ

CML no EQ

Mix [ 1/2 1/2 -1/2 -1/2 ]

CML with EQ

CML no EQ

Mix [ 1 -1 0 0 ]

CML with EQ

CML no EQ

METHOD AND APPARATUS FOR HIGH SPEED CHIP-TO-CHIP COMMUNICATIONS

CROSS REFERENCE TO RELATED APPLICATIONS

This application claims priority to U.S. Provisional Patent Application 62/067,430, filed Oct. 22, 2014, entitled "Method and Apparatus for High Speed Chip-to-Chip Communications," which is herein incorporated by reference in its entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling", hereinafter identified as [Cronie I];

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes", hereinafter identified as [Cronie II];

U.S. patent application Ser. No. 14/158,452, filed Jan. 17, 2014, naming John Fox, Brian Holden, Peter Hunt, John D Keay, Amin Shokrollahi, Richard Simpson, Anant Singh, Andrew Kevin John Stewart, and Giuseppe Surface, entitled "Chip-to-Chip Communication with Reduced SSO Noise", hereinafter identified as [Fox I];

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application No. 61/934,804, filed Feb. 2, 2014, naming Ali Hormati and Amin Shokrollahi, entitled "Methods for Code Evaluation Using ISI Ratio", hereinafter identified as [Hormati I];

U.S. Provisional Patent Application No. 61/934,807, filed Feb. 2, 2014, naming Amin Shokrollahi, entitled "Vector Signaling Codes with High pin-efficiency and their Application to Chip-to-Chip Communications and Storage", hereinafter identified as [Shokrollahi I];

U.S. Provisional Patent Application No. 61/839,360, filed Jun. 23, 2013, naming Amin Shokrollahi, entitled "Vector Signaling Codes with Reduced Receiver Complexity", hereinafter identified as [Shokrollahi II].

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi III].

U.S. Provisional Patent Application No. 62/015,172, filed Jul. 10, 2014, naming Amin Shokrollahi and Roger Ulrich, entitled "Vector Signaling Codes with Increased Signal to Noise Characteristics", hereinafter identified as [Shokrollahi IV].

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

U.S. Provisional Patent Application No. 62/026,860, filed Jul. 21, 2014, naming Roger Ulrich and Amin Shokrollahi, entitled "Bus Reversible Orthogonal Differential Vector Signaling Codes", hereinafter identified as [Ulrich II].

The following additional references to prior art have been cited in this application:

U.S. Pat. No. 7,053,802, filed Apr. 22, 2004 and issued May 30, 2006, naming William Cornelius, entitled "Single-Ended Balance-Coded Interface with Embedded-Timing", hereinafter identified as [Cornelius];

U.S. Pat. No. 8,064,535, filed Mar. 2, 2007 and issued Nov. 22, 2011, naming George Wiley, entitled "Three Phase and Polarity Encoded Serial Interface, hereinafter identified as [Wiley].

U.S. Pat. No. 8,649,460, filed Mar. 11, 2010 and issued Feb. 11, 2014, naming Frederick Ware and Jade Kizer, entitled "Techniques for Multi-Wire Encoding with an Embedded Clock", hereinafter identified as [Ware].

FIELD OF THE INVENTION

Described embodiments relate generally to the field of communications, and more particularly to the transmission and reception of signals capable of conveying information within and between integrated circuit devices.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

Any suitable subset of a vector signaling code denotes a "sub code" of that code. Such a subcode may itself be a vector signaling code. With binary vector signaling, each component or "symbol" of the vector takes on one of two possible values. With non-binary vector signaling, each symbol has a value that is a selection from a set of more than two possible values. When transmitted as physical signals on a communications medium, symbols may be represented by particular physical values appropriate to that medium; as examples, in one embodiment a voltage of 150 mV may represent a "+1" symbol and a voltage of 50 mV may represent a "−1" symbol, while in another embodiment "+1" may be represented by 800 mV and "−1" as −800 mV.

A vector signaling code, as described herein, is a collection C of vectors of the same length N, called codewords. The ratio between the binary logarithm of the size of C and the length N is called the pin-efficiency of the vector signaling code. The Orthogonal Differential Vector Signaling (ODVS) codes of [Cronie I], [Cronie II], [Fox I], [Shokrollahi I], [Shokrollahi II], and [Shokrollahi III] are examples of vector signaling codes, and are used herein for descriptive purposes.

BRIEF DESCRIPTION

Orthogonal differential vector signaling codes providing transport for both data and a clocking signal are described which are suitable for implementation in conventional high-speed CMOS integrated circuit processes. Embodiments providing higher transfer speed using fewer pins than comparable M-PHY solutions are described, as are embodiments supporting a backward-compatible M-PHY mode.

DETAILED DESCRIPTION

Figure 1:
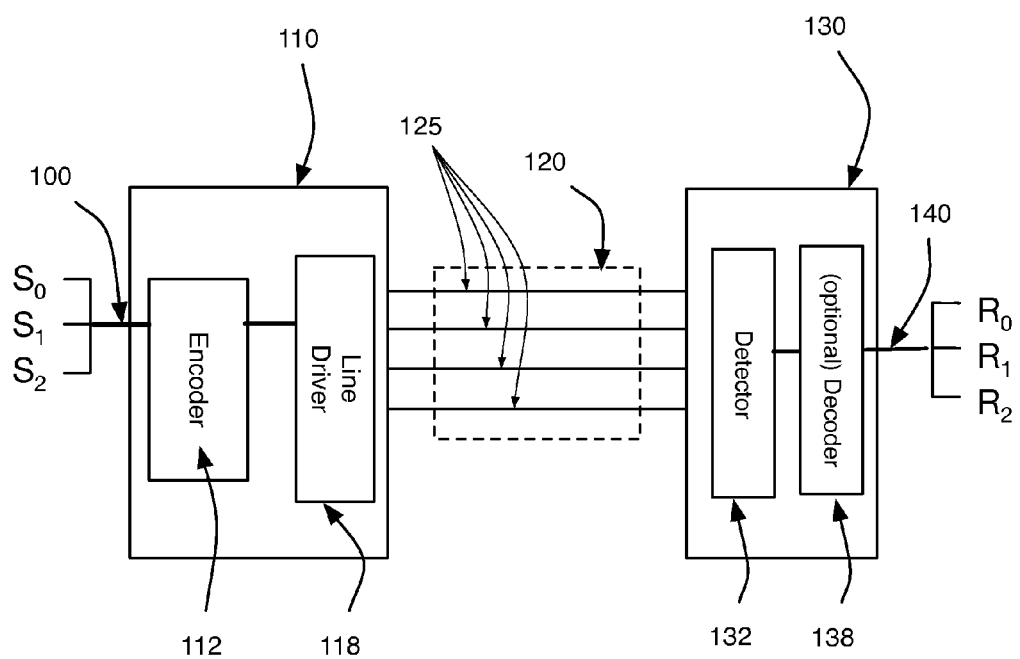
FIG. 1 illustrates a communication system in accordance with at least one embodiment employing vector signaling codes.

FIG. 1 illustrates a communication system in accordance with some embodiments employing vector signaling codes. Source data to transmitter 110, herein illustrated as S0, S1, S2 enter block-wise 100 into encoder 112. The size of the block may vary and depends on the parameters of the vector signaling code. The encoder 112 generates a codeword of the vector signaling code for which the system is designed. In operation, the codeword produced by encoder 112 is used to control PMOS and NMOS transistors within driver 118, generating two, three, or more distinct voltages or currents on each of the N communication wires 125 of communications channel 120, to represent the N symbols of the codeword. Within communications receiver 130, detector 132 reads the voltages or currents on the N wires 125, possibly including amplification, frequency compensation, and common mode signal cancellation, providing its results to decoder 138, which recreates the input bits as received results 140, herein shown as R0, R1, R2. As will be readily apparent, different codes may be associated with different block sizes and different codeword sizes; for descriptive convenience and without implying limitation, the example of FIG. 1 illustrates a system using an ODVS code capable of encoding a three binary bit value for transmission over four wires, a so-called 3b4w code.

In some embodiments, depending on which vector signaling code is used, there may be no decoder, or no encoder, or neither a decoder nor an encoder. For example, for the 8b8w code disclosed in [Cronie II], both encoder 112 and decoder 138 exist. On the other hand, for the H4 code disclosed in [Cronie I] (also described as ENRZ,) an explicit decoder may be unnecessary, as the system may be configured such that detector 132 generates the received results 140 directly.

The operation of the communications transmitter 110 and communications receiver 130 have to be completely synchronized in order to guarantee correct functioning of the communication system. In some embodiments, this synchronization is performed by an external clock shared between the transmitter and the receiver. In addition, the receiver may have a PLL ("Phase Lock Loop",) which may create multiple phases for the operation of the receiver. Other embodiments may combine the clock function with one or more of the data channels, as in the well-known Biphase encoding used for serial communications, or using the embedded clock methods subsequently described herein.

Receivers Using Multi-Input Comparators

As described in [Holden I], a multi-input comparator with coefficients a0, a1, . . . , am−1 is a circuit that accepts as its input a vector $(x_0, x_1, \ldots, x_{m-1})$ and outputs $$\text{Result} = (a_0 * x_0 + \ldots + a_{m-1} * x_{m-1}) \quad \text{(Eqn. 1)}$$

In many embodiments, the desired output is a binary value, thus the value Result is sliced with an analog comparator to produce a binary decision output. Because this is a common use, the colloquial name of this circuit incorporates the term "comparator", although other embodiments may use a PAM-3 or PAM-4 slicer to obtain ternary or quaternary outputs, or indeed may retain the analog output of Eqn. 1 for further computation. A set of such multi-input comparators sufficient to uniquely identify each codeword of the vector signaling code is said to "detect" the code.

Receivers Described in Matrix Notation

Mathematically, the set of multi-input comparators comprising a code receiver may be concisely described using matrix notation, with the columns of the matrix corresponding to consecutive elements of input vector $(x_0, x_1, \ldots, x_{m-1})$ i.e. the plurality of signal conductor or wire inputs carrying the vector signaling code, and each row of the matrix corresponding to a particular multi-input comparator and its output. In this notation, the value of matrix element corresponds to the weight vector or set of scaling factors applied to that column's input values by that row's multi-input comparator. The matrix of Eqn. 2 describes one such set of multi-input comparators comprising a code receiver.

$$\begin{array}{cccc} 1 & 1 & 1 & 1 \\ 1 & -1 & 0 & 0 \\ 0 & 0 & 1 & -1 \\ 1/2 & 1/2 & -1/2 & -1/2 \end{array} \quad \text{(Eqn. 2)}$$

In this embodiment, four input wires, represented by the four matrix columns, are processed by three multi-input comparators represented by matrix rows 2, 3, and 4. For purposes to be subsequently described, the first matrix row is comprised of all "1" values, creating a square 4×4 matrix.

As used herein, a matrix M such as that of Eqn. 2 is called "orthogonal" if $M^T M = D$ that is, if the product of the transpose of the matrix and the matrix itself is a diagonal matrix having non-zero values only on its diagonal. This is a weaker definition than commonly used, where the result is required to be the identity matrix, i.e. having diagonal values equal to 1. Matrix M may be normalized to satisfy the stronger conventional orthogonality requirement, but as will subsequently be described such normalization is neither necessary nor desirable in practice.

Functionally, orthogonality requires that the vector of weights in a row representing a multi-input comparator be orthogonal to all other rows, and that each row representing a multi-input comparator sums to zero. As this implies the comparator outputs are also orthogonal (i.e. independent,) they represent distinct communications modes, herein described as "sub-channels" of the Vector Signaling Code communications system.

Given this modal interpretation, the initial row of the matrix may be seen to represent the common-mode communications channel over the transmission medium. As it is desirable in a practical system for the receiver to have common-mode rejection, the first row is set to all "1" values, maximizing the common mode contribution of each wire input to this one matrix row. As by definition all rows of the matrix are orthogonal, it follows that no other matrix row (i.e. no receiver output) may then be impacted by common mode signals. Embodiments having such common mode rejection need not implement a physical comparator corresponding to the first row of their descriptive matrix.

For avoidance of confusion, it is noted that all data communications in an ODVS system, including the state changes representing signals carried in subchannels, are communicated as codewords over the entire channel. An embodiment may associate particular mappings of input values to codewords and correlate those mappings with particular detector results, as taught herein and by [Holden I] and [Ulrich I], but those correlations should not be confused with partitions, sub-divisions, or sub-channels of the physical communications medium itself. Similarly, the concept of ODVS sub-channels is not limited by the example embodiment to a particular ODVS code, transmitter embodiment, or receiver embodiment. Encoders and/or decoders maintaining internal state may also be components of embodiments described herein. Sub-channels may be represented by individual signals, or by states communicated by multiple signals.

[Shokrollahi II] describes methods of constructing orthogonal matrices that may be utilized as described herein.

Generating ODVS Codes Corresponding to a Receiver Matrix

As described in [Cronie I] and [Cronie II], an Orthogonal Differential Vector Signaling code may be constructed from a generator matrix by multiplication of an input modulation vector of the form $(0, a_1, a_2, \ldots a_{n-1})$ by the matrix M of size n, and then normalizing the results to be within the range ±1. In the simplest case, each $a_i$ of this vector is the positive or negative of a single value, as example ±1, representing one bit of transmitted information.

Given our understanding of M as describing the various communications modes of the system, it may readily be seen that multiplication of the matrix by such an input vector comprises excitation of the various modes by the ai, of that vector, with the zeroth mode corresponding to common mode transmission not being excited at all. It will be obvious to one familiar with the art that transmission energy emitted in the common mode is both unnecessary and wasteful in most embodiments. However, in at least one embodiment, a nonzero amplitude for the common mode term is used to provide a nonzero bias or baseline value across the communications channel.

It also may be seen that the various codewords of the code generated using this method represent linear combinations of the various orthogonal communication modes. Without additional constraints being imposed (e.g., for purposes of implementation expediency,) this method results in systems capable of communicating N−1 distinct subchannels over N wires, typically embodied as a N−1 bit/N wire system. The set of discrete codeword values needed to represent the encoded values is called the alphabet of the code, and the number of such discrete alphabet values is its alphabet size. As a further example, the code generated by this method from the matrix of Eqn. 2 is shown in Table 1.

TABLE 1

[0, 1, −1, 0], [1, 0, −1, 0], [0, 1, 0, −1], [1, 0, 0, −1]
[0, −1, 1, 0], [−1, 0, 1, 0], [0, −1, 0, 1], [−1, 0, 0, 1]

As may be readily observed, the alphabet of this code consists of the values +1, 0, −1, thus this is a ternary code (e.g. having an alphabet size of three.) This code will subsequently be described herein as the P4 Code, capable of communicating up to three bits of information on four wires, and its corresponding receive matrix of Eqn. 2 as the P4 receiver.

Timing Information on a Sub-Channel

As an ODVS communications system must communicate each combination of data inputs as encoded transmissions, and the rate of such encoded transmissions is of necessity constrained by the capacity of the communications medium, the rate of change of the data to be transmitted must be within the Nyquist limit, where the rate of transmission of codewords represents the sampling interval. As one example, a binary clock or strobe signal may be transmitted on an ODVS sub-channel, if it has no more than one clock edge per codeword transmission.

An embodiment of an ODVS encoder and its associated line drivers may operate asynchronously, responding to any changes in data inputs. Other embodiments utilize internal timing clocks to, as one example, combine multiple phases of data processing to produce a single high-speed output stream. In such embodiments, output of all elements of a codeword is inherently simultaneous, thus a strobe or clock signal being transported on a sub-channel of the code will be seen at the receiver as a data-aligned clock (e.g. with its transition edges occurring simultaneously to data edges on other sub-channels of the same code.) Similar timing relationships are often presumed in clock-less or asynchronous embodiments as well.

ISI Ratio

As taught in [Hormati I], the ISI ratio is the ratio of the smallest to the largest absolute magnitude signals obtained at the output of a linear multi-input comparator, such as described by Eqn. 1 or by a matrix row representing a comparator output as in the matrix of Eqn. 2. Systems having an ISI ratio of 1 are desirable, in that each output value transitions between only two possible results for binary modulation, for example between +1 and −1, minimizing the potential impact of inter-symbol interference. Systems with higher ISI ratios may, by further example, identify a data "1" as any of two or more possible subchannel positive signal values, and a data "0" as any of two or more possible subchannel negative values.

Orthogonal receive matrices and the corresponding codes generated for them using the described methods inherently have an ISI ratio of 1, and are preferable embodiments in practical systems.

Normalizing Subchannel Gain

For some orthogonal matrices and their corresponding codes, it may be observed that the subchannel responses (that is, the magnitudes obtained by multiplying the codeword values by the matrix values) may not be identical. This variation is the result of our loosened definition of orthogonality for the receive matrix, as the non-unity values of the diagonal $M^TM=D$ represent non-unity gains for the corresponding subchannels. As will be apparent to one familiar with the art, normalizing the matrix (i.e. scaling its elements such that the diagonal values are 1), will result in a system having constant unity gain across all subchannels. However, such known normalization methods may lead to suboptimal embodiments as the large number of distinct normalized coefficient values, in many cases including irrational values, are difficult to embody in a practical system.

At least one embodiment retains an unnormalized matrix with its convenient to implement coefficient values, and instead compensates for the variation of subchannel amplitude by modifying the input signal amplitudes modulating the various subchannel. For example, a hypothetical system having eight subchannels of unity gain and one subchannel of 0.8 gain will ultimately be SNR limited by the latter output. Thus, increasing the last subchannel's transmission input to {+1.2, −1.2} will bring up the corresponding channel output. Alternatively, decreasing all other subchannel inputs to {+0.8, −0.8} will lower the corresponding channel outputs, such that all channels have equal output levels with less transmit power required.

This compensation technique is not without cost, however. As taught by [Shokrollahi IV], modifying the input vector leads to an increase in the alphabet size needed (and thus, the number of discrete signal levels the transmitter must generate) to communicate the codewords over the channel. [Shokrollahi IV] teaches numeric methods to select suitable modulation amplitudes that result in closer matching of subchannel outputs with minimal expansion of the required alphabet size.

P3 Code

P3 is an orthogonal differential vector signaling code suitable for use with low-skew communications channels comprised of multiples of three wires. The codewords of the P3 Code are the four triplets $$\pm[0,1,-1], \pm[-1,1,0] \qquad [\text{Eqn. 3}]$$

Note that in this embodiment, the +1 values and −1 values are always transmitted on adjacent wires, which may serve to reduce electromagnetic interference (EMI) with other parts of the circuit. A clock may be embedded into the P3 Code by guaranteeing a codeword transition every Unit Interval, resulting in three unconstrained codewords being available for data communication purposes during each UI.

An embodiment of a detector for the P3 Code is defined by the matrix $$\begin{matrix} 1 & 1 & 1 \\ 1 & 0 & -1 \\ 1/2 & -1 & 1/2 \end{matrix} \qquad [\text{Eqn. 4}]$$

Thus, a common-mode rejecting embodiment for three wires x0, x1, x2 is comprised of two comparators, the first comparing x0 and x2, and the second comparing the average of x0 and x2 with x1. The ISI ratio as described in [Hormati I] is 1, representing the lowest achievable level of inter-symbol interference susceptibility.

One familiar with the art will observe that clock extraction may be readily obtained by a receive-side clock detector monitoring the two comparator outputs for transitions, and a transmit-side transition guarantee insuring that no two consecutive unit intervals will carry the same codeword. One embodiment of such an embedded clock system utilizes a history register within the transmitter to provide the previous UI's data value $\hat{a}$, $\hat{b}$ for comparison with the current UI's data value a, b and subsequent codeword duplication avoidance.

As the clock-embedded P3 Code cannot transmit a full two binary bits per UI, note that in a practical embodiment the input combination a=1, b=1 cannot exist. Thus the bits are first conditioned to provide data bits pairs (x,y) such that $(x,y) \neq (1,1)$. Given this constraint, the encoder performs the operation:

$$(an, bn) \text{xor}(\overline{x}, \overline{y}) = (\hat{a} \text{xor} \overline{x}, \hat{b} \text{xor} \overline{y}) \qquad [\text{Eqn. 5}]$$

to determine the values to be transmitted in the current UI, and then updates the history register $$(an, bn) \rightarrow (ah, bh) \qquad [\text{Eqn. 6}]$$

to prepare it for the next encoding operation.

Figure 10:
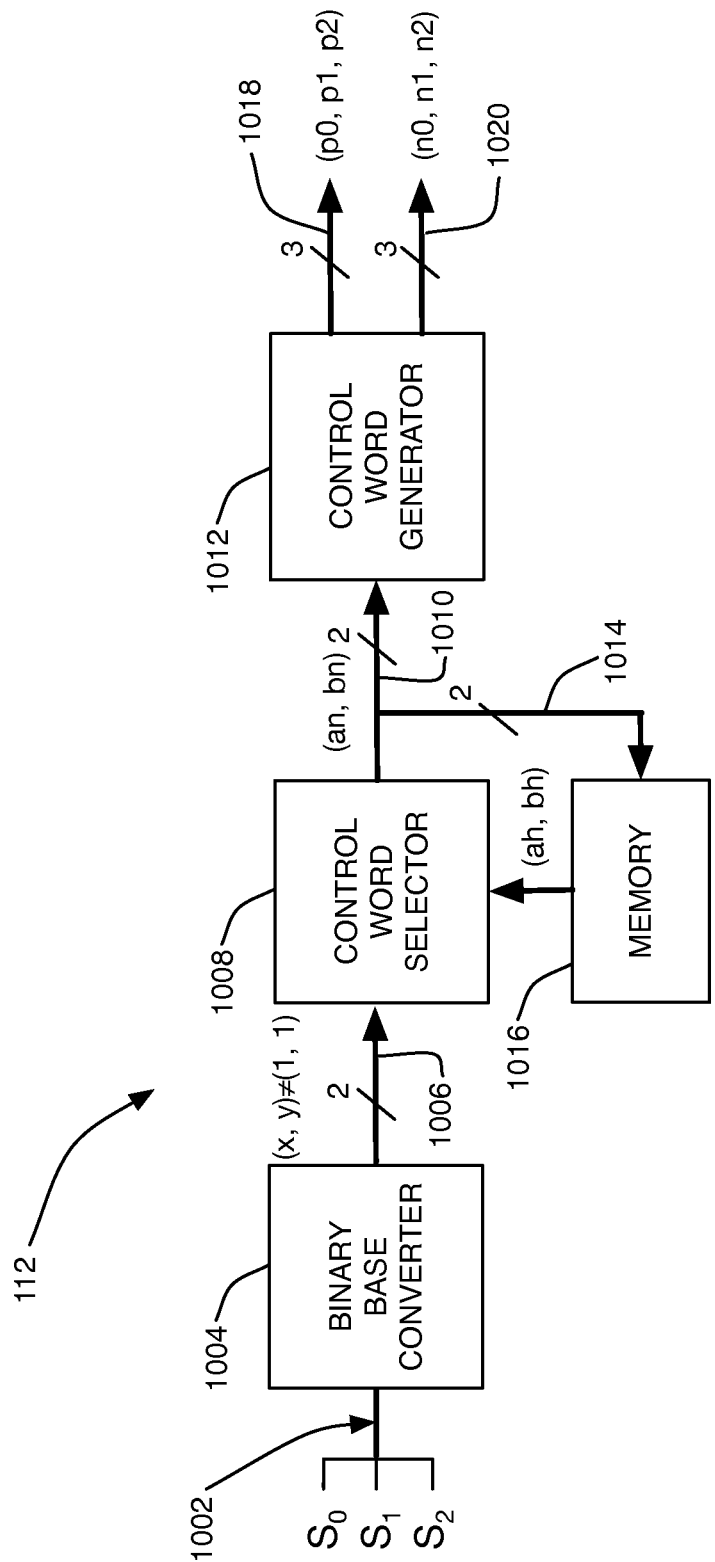
FIG. 10 is a block diagram of an encoder, in accordance with some embodiments.

In one embodiment, FIG. 10 depicts an encoder 112 for use with a three-wire communications medium. The binary base converter circuit 1004 receives a block of data bits, shown in the example of FIG. 10 as three binary digits ($S_0$, $S_1$, $S_2$), and it converts the block of data bits into a sequence of bit pairs that exclude the bit pair 11 ($(x,y) \neq (1,1)$). That is, each bit pair can only take on one of three values 00, 01, 10, and in this sense may be referred to herein as a ternary bit pair. This conversion may be performed in various ways, and is equivalent to a modulus conversion, or base conversion, from binary to ternary (although the ternary coefficients are still represented in binary form).

The conversion may be understood as follows: the block of data bits (say 3 bits) bits may interpreted as an integer between 0 and $(2^3)-1$, and a 3-adic representation of this integer is calculated, i.e., the integer is represented in the form a0+3*a1 with each ai being between 0 and 2. Each of the ai is then a 2-bit integer that is not equal to 3 and can be used as an input to the control word selector 1008. In this example, three data bits are converted to two two-bit pairs. In a further example, a block of 32 bits may be processed to convert a number between 0 and $(2^{32})-1$ to the form a0+3*a1+9*a2+27*a3+ . . . +$3^{20}$*a20 with each ai being between 0 and 2. Similarly, 16 bits (or 17) may be converted to 11 bit-pairs. Generally i bits can be converted to j ternary bit pair coefficients as long as $2^i < 3^j$. In some embodiments, the blocks of data bits may be multiples of 8, 16, 32, or 64, as these are common bit and word lengths in present-data computer architectures.

The binary base converter 1004 may be implemented using straightforward combinatorial logic gates to map the input bit sequences to a corresponding sequence of ternary bit pairs that are then output sequentially on signal line 1006 for processing by the control word selector circuit 1008. The control word selector circuit 1008 generates a control word selector signal (an, bn) on signal line 1010 based on a combination of the ternary bit pairs (x,y) received on signal line 1006 with the prior control word selector signal (ah, bh). As described above, the ternary bit pair of bits (x,y) is such that (x,y) is not (1,1). One suitable mapping performed by the control word selector circuit 1008 to determine a control word selector bit pair (an, bn) is as follows:

$$(an,bn)=(ah\,xor\,\bar{x},bh\,xor\,\bar{y}),$$

wherein $\bar{x}$=the complement of x.

Figure 12:
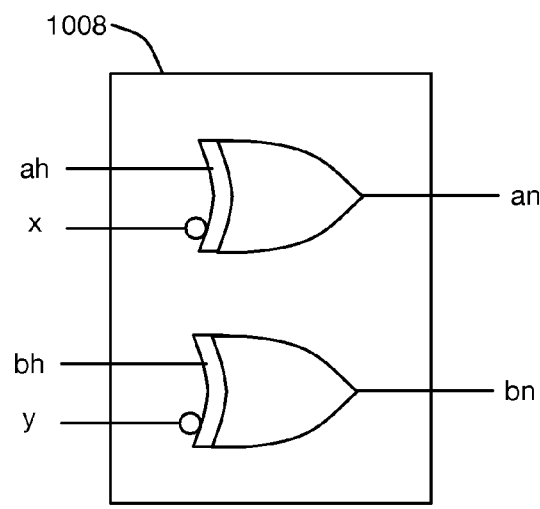
FIG. 12 is a schematic for a logical signal mapping performed by the control word selector circuit

The circuit shown in FIG. 12 is one implementation of the logical signal mapping performed by the control word selector circuit 1008. Note that (an,bn) is always different from (ah,bh) because $(\bar{x},\bar{y})$ can never be (0,0). In addition, valid combinations of control word selector bit pairs (an, bn) include all four possible bit pairs {00, 01, 10, 11}. These four bit pairs are then used to select one of four codewords for transmission on the inter-chip communications bus. The control word selector signal thus represents a differentially coded bit sequence, which can be used to ensure that non-repeating codewords are selected for transmission.

Figure 13:
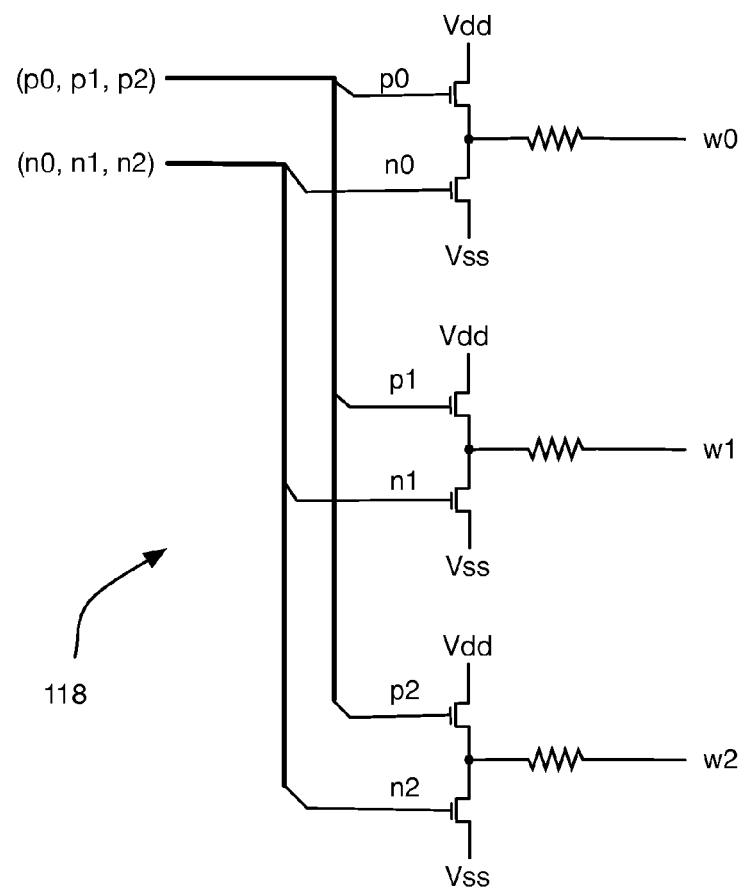
FIG. 13 is a schematic for a line driver, in accordance with some embodiments.

In one embodiment, the values of (an, bn) are forwarded to the control word generator 1012 on signal line 1010. The control word generator 1012 computes p(an, bn) and n(an, bn) to obtain the corresponding mask vectors, or control codeword, for the drivers as shown in FIG. 13. Note that the control codewords in two consecutive signaling intervals cannot ever be both the same, since the mapping from bit-pairs to control bits is 1 to 1. These control codewords have three bits, and are of Hamming weight one. The position of the 1 in the p control codeword is the position of the +1 in the transmitted codeword, and the position of the 1 in n is the position of −1 in the transmitted codeword.

Figure 11:
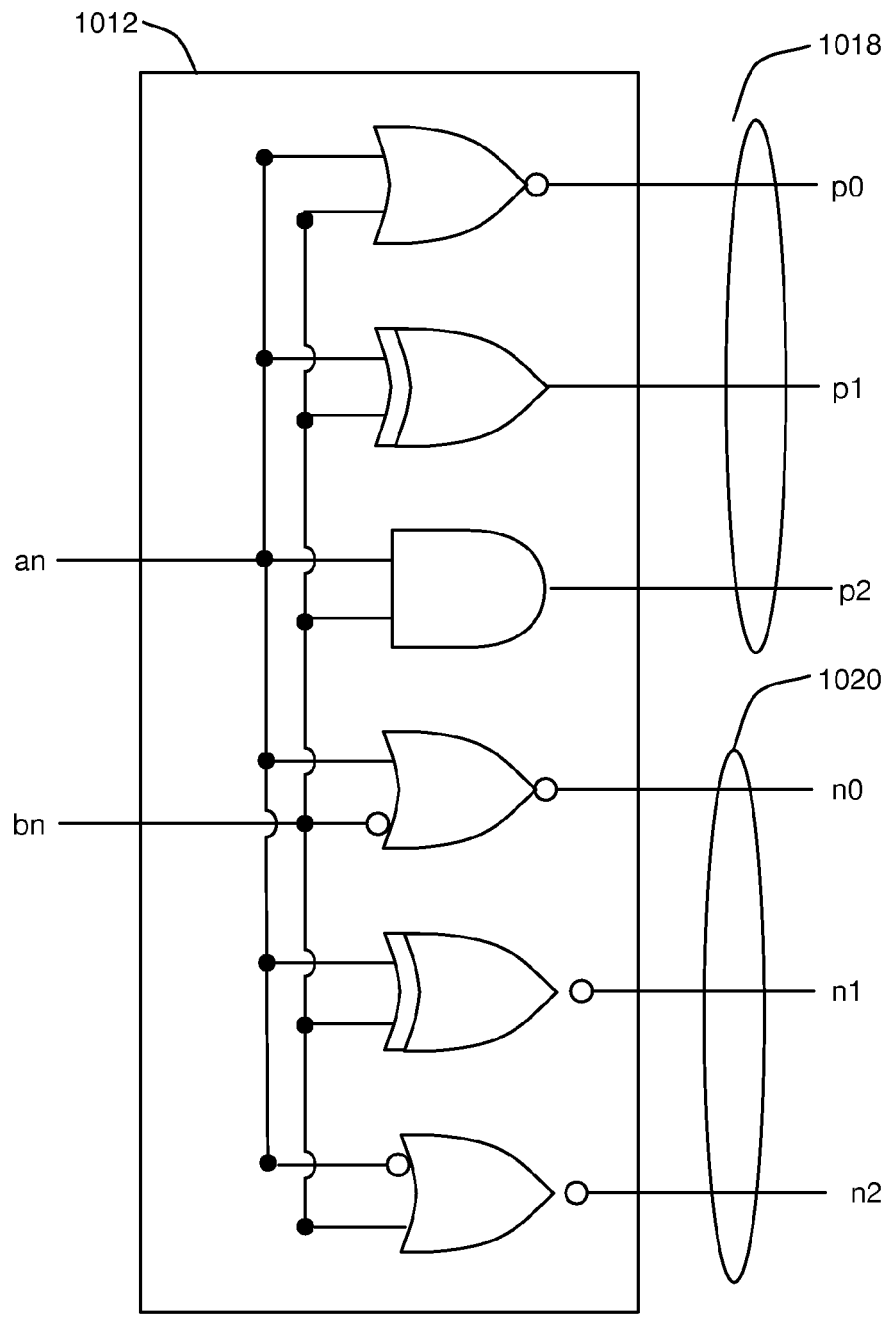
FIG. 11 is a schematic for a logic mapping circuit, in accordance with some embodiments.

There are many such mappings, but one example mapping is:

$$p=(nor(a,b),a\,xor\,b,a\&b),n=(nor(a,\bar{b}),\overline{a\,xor\,b}),\\ nor(\bar{a},b)),$$

which is implemented by the logic gate circuitry of FIG. 11. Further embodiments exist that provide a similar mapping. The control codewords on lines 1018 and 1020 will cause the transistors of the line driver circuit 118 drive one wire low, one wire high, and leave the third wire at a third value (e.g., undriven, or floating).

P3-Mod

An alternate embodiment of the P3 Code uses the modified set of codewords $$\pm[\tfrac{1}{3},-\tfrac{4}{3},1],\pm[1,-\tfrac{4}{3},\tfrac{1}{3}] \qquad [\text{Eqn. 7}]$$

with the same receiver structure defined by the matrix of Eqn. 4 for the P3 Code. This set of codewords provides normalized subchannel gain and thus increased detector eye opening, as previously described, at the cost of a more complex transmit driver to produce the necessary signal amplitudes.

P4 Code

P4 is an orthogonal differential vector signaling code suitable for use with low-skew communications channels composed of multiples of four wires. The codewords of the P4 Code are the eight quadruplets $$\pm[0,1,-1,0],\pm[1,0,-1,0],\pm[0,1,0,-1],\pm[1,0,0,-1] \qquad [\text{Eqn. 8}]$$

As with the previously-described P3 Code, a clock may be embedded into the P4 Code by guaranteeing a codeword transition every Unit Interval, resulting in seven codewords being available for data communication purposes.

One detector embodiment for the P4 Code is defined by the matrix $$\begin{matrix} 1 & 1 & 1 & 1 \\ 1 & -1 & 0 & 0 \\ 0 & 0 & 1 & -1 \\ 1/2 & 1/2 & -1/2 & -1/2 \end{matrix} \qquad [\text{Eqn. 9}]$$

Thus, a common-mode rejecting embodiment for four wires x0, x1, x2, x3 is composed of three comparators, the first comparing x0 and x1, the second comparing x2 and x3, and the third comparing the average of x0 and x1 with the average of x2 and x3. The ISI ratio as described in [Hormati I] is 1, representing the lowest achievable level of inter-symbol interference susceptibility.

One embodiment of an embedded clock system comparable to that described for use with the P3 code also utilizes a history register within the transmitter to provide the previous UI's data value â, b̂, ĉ for comparison with the current UI's data value a, b, c.

As the clock-embedded P4 Code cannot transmit a full three binary bits per UI, note that in a practical embodiment the input combination a=1, c=1 cannot exist. Given this constraint, the encoder performs the operation $$(\hat{a},\hat{b},\hat{c})\,xor\,(\overline{a},b,\overline{c})=(\hat{a}\,xor\,\overline{a},\hat{b}\,xor\,b,\hat{c}\,xor\,\overline{c}) \qquad [\text{Eqn. 10}]$$

and then updates the history register $$(a,b,c) \rightarrow (\hat{a},\hat{b},\hat{c}) \qquad [\text{Eqn. 11}]$$

to prepare it for the next encoding operation.

P4 Code with Simple Clock

A preferred alternative embodiment embedding a clock in the P4 code removes the constraint on a, b, c, and modifies Eqn. 10 to be $$(\hat{a},\hat{b},\hat{c}) \text{xor}(1,b,c) = (\hat{a} \text{xor} 1, \hat{b} \text{xor} b, \hat{c} \text{xor} c) \qquad [\text{Eqn. 12}]$$

One familiar with the art will note that, using Eqn. 12, the a term toggles on each consecutive UI, providing the embedded clock, with the b and c terms available for unconstrained data communication use. Thus, this embodiment communicates two binary data bits and an embedded clock per unit interval.

Support for M-PHY Legacy Mode

It is always advantageous for new and/or enhanced interface designs to support legacy mode interconnection to previous-generation devices. For example, a mobile device application processor may benefit from supporting both a P4 Code high-speed mode to communicate with new peripheral devices embodying a P4 Code interface, and a M-PHY mode to communicate with older peripheral devices.

The minimum interface size for M-PHY is four pins; a two wire differential data channel, and a two wire differential clock channel. One may observe that the first and second receive comparators for the described P4 receiver embodiment provides these two differential channel receivers. In the preferred P4 with simple clock embodiment, the embedded clock is received on the first comparator, which may advantageously be used as the differential clock input in legacy M-PHY mode, while the second comparator is used as the differential data input in legacy M-PHY mode. The third comparator may be powered down in M-PHY legacy mode.

Legacy M-PHY operation may also be provided in systems using the P3 code; an additional wire input and an additional comparator may be used to support the four wire legacy interface, and the P3 embedded clock logic must be disabled and bypassed in legacy M-PHY mode.

Figure 3A:
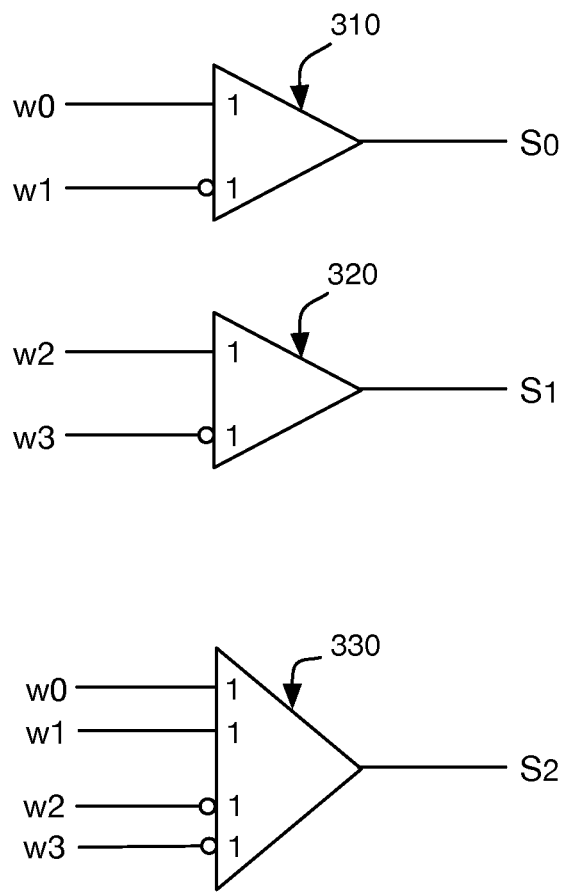
FIG. 3A illustrates an embodiment of the detector for P4 code.
Figure 3B:
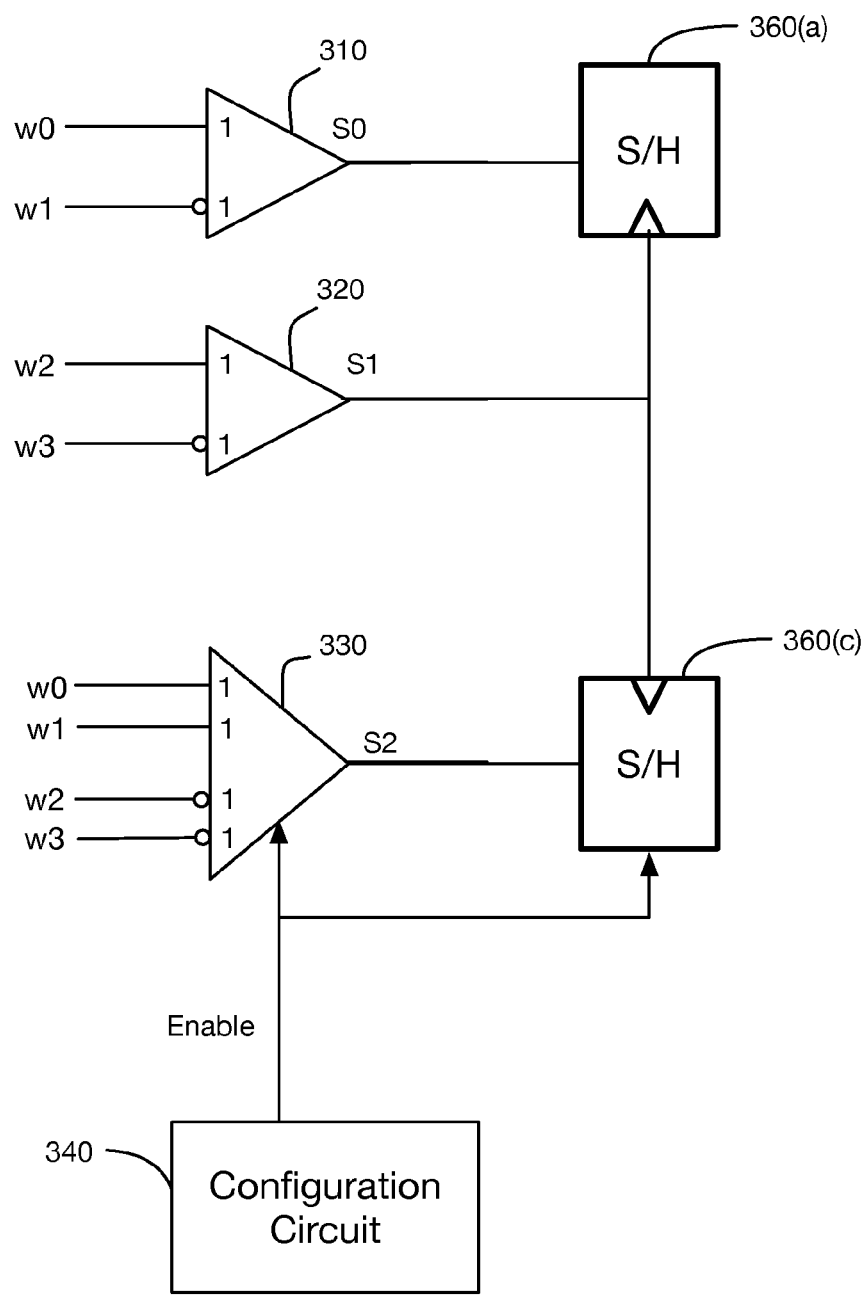
FIG. 3B illustrates a device configurable to operate in legacy mode or in P4 mode with embedded subchannel clock.
Figure 3C:
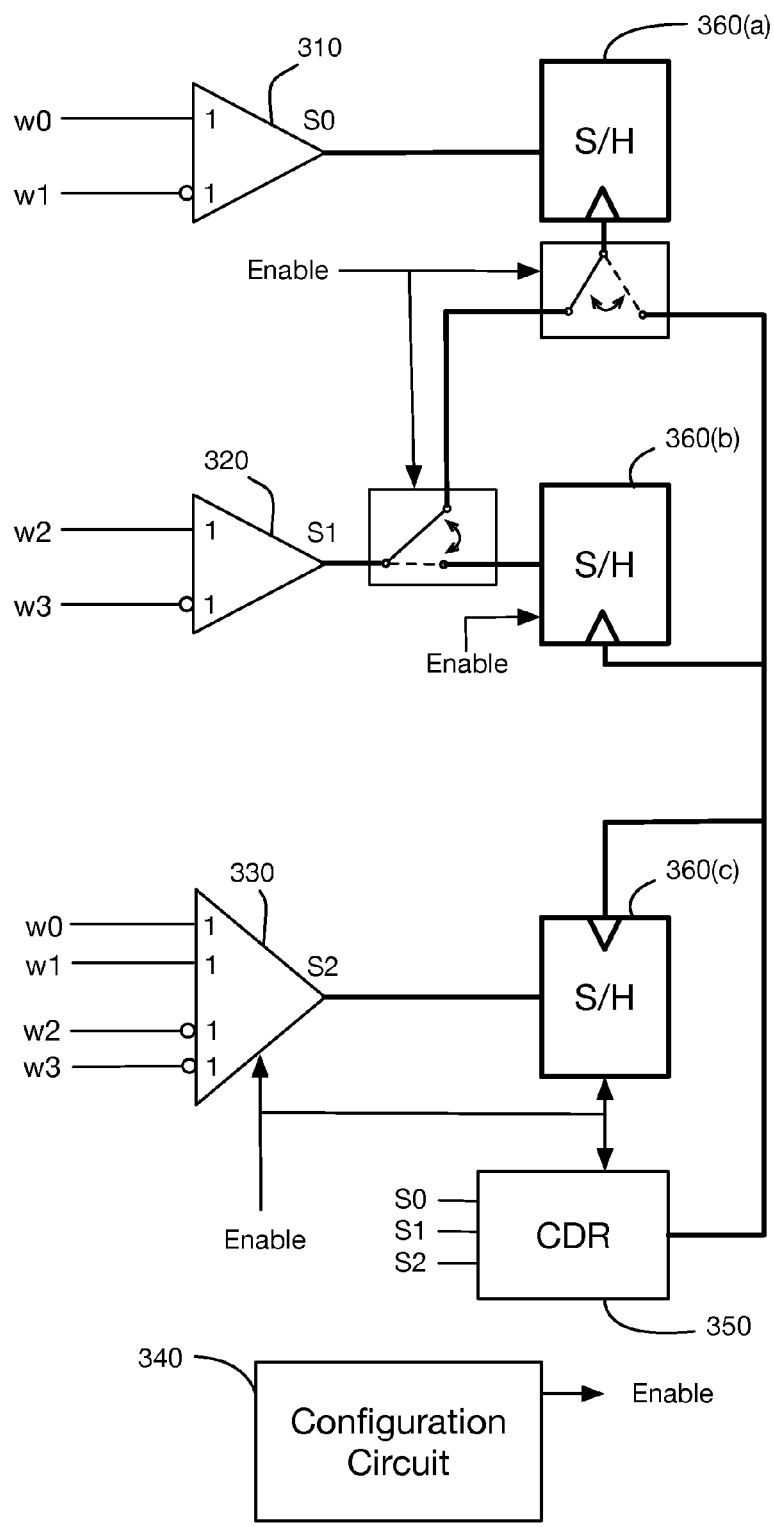
FIG. 3C illustrates a device configurable to operate in legacy mode or in P4 mode with recovered clock.
Figure 3D:
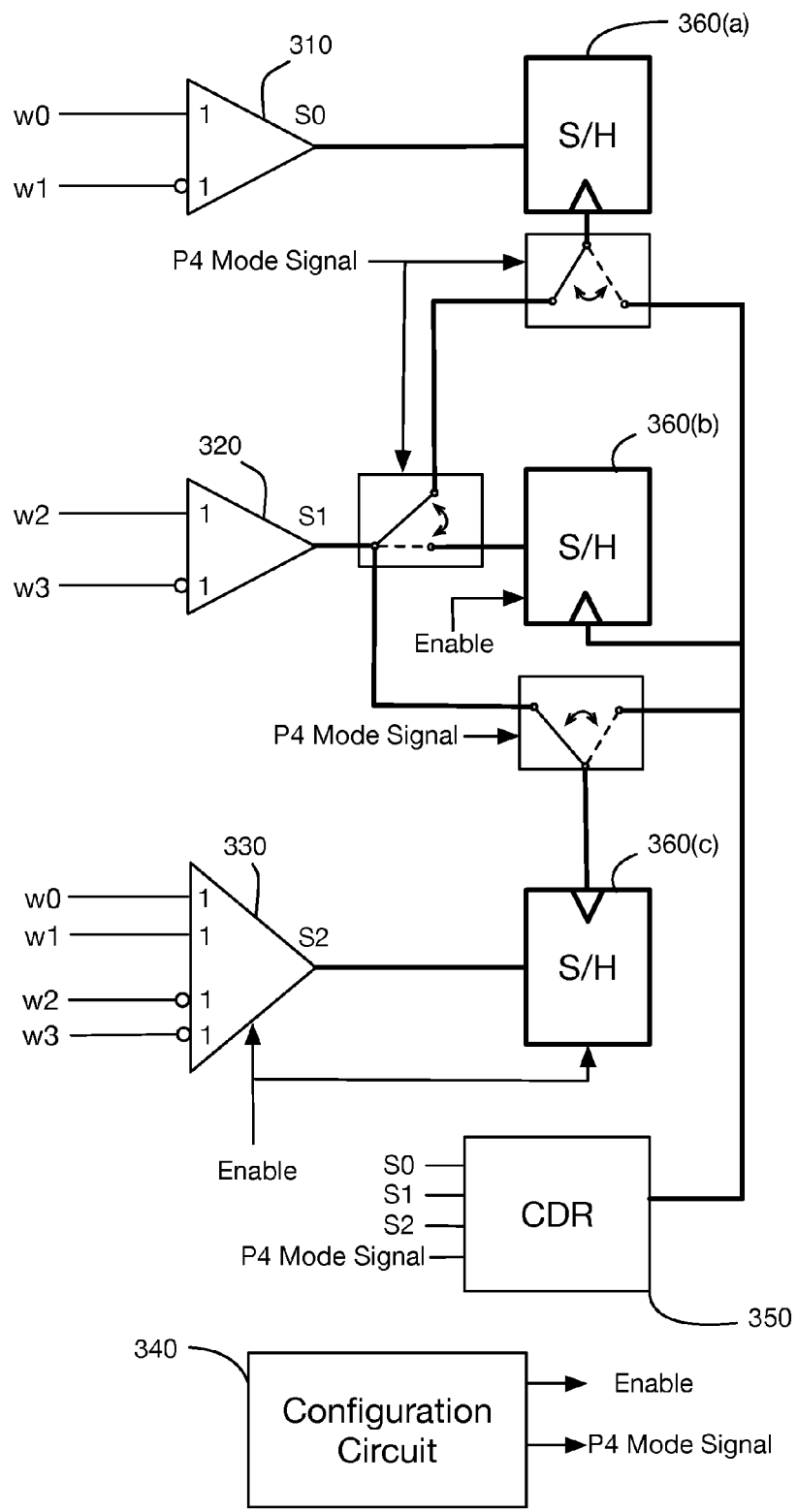
FIG. 3D illustrates a device configurable to operate in legacy mode or in P4 mode with embedded subchannel clock or recovered clock.

FIGS. 3B-3D depict configurable receivers for operation in either a legacy mode (or first operating mode) for communicating with legacy M-PHY devices or the new P4 mode (or second operating mode) described herein. Such a device is composed of a common wire signal receiver configurable to operate in either mode, connecting to instances of either a peripheral component compatible with M-PHY communications, or a peripheral compatible with P4 communications.

The receiver shown in FIG. 3B is configurable to operate in legacy mode (or M-PHY mode) or in P4 mode, where P4 mode uses comparator 320 as an embedded subchannel clock. In legacy mode, comparator 310 supplies an output to data detector 360(a) as a data input, and the output of comparator 320 supplies an output to data detector 360(a) as the clock input. Data detector 360(c) is also shown to accept the output of comparator 320 as an embedded subchannel clock signal, and receiving the output of comparator 330 as a data input. A configuration circuit 340 may be configured to provide an enable signal to comparator 330 and data detector 360(c). In legacy mode, the enable signal may disable or power down comparator 330 and data detector 360(c) so that only data detector 360(a) is operational. In P4 mode the enable signal may enable comparator 330 and data detector 360(c).

FIG. 3C depicts a receiver that may be configurable to operate in legacy mode or a P4 mode that extracts a clock signal using clock and data recovery (CDR) circuit 350. In some embodiments, CDR circuit 350 receives the three comparator outputs and outputs a clock signal. In some embodiments, the clock signal is generated using transitions of at least one of the comparators. In such an embodiment, a transition code may be used to guarantee at least one of the comparators transitions every unit interval. FIG. 3C also includes an additional data detector 360(b) that may be configured to sample the output of comparator 320 in P4 mode, and two switches that may connect/disconnect various interconnections based on operating mode. In legacy mode, the switches connect comparator 320 to the clock input of data detector 360(a) (in some embodiments based on the enable signal), and the configuration circuit is configured to power down data detectors 360(b), 360(c) and comparator 330.

In P4 mode, the configuration circuit 340 enables comparator 330 and data detectors 360(b) and 360(c), connects the output of comparator 320 to the data input of data detector 360(b), and connects the output of CDR circuit 350 to the clock input of data detector 360(a). Data detectors also receive the output of CDR circuit 350, and since these data detectors only function in P4 mode and only use the CDR output, no switches are necessary. While operating in P4 mode, the circuit samples 3 comparator outputs (S0, S1, and S2) based on a clock recovered from the comparator outputs.

FIG. 3D depicts a receiver in accordance with some embodiments. FIG. 3D depicts a combination of FIGS. 3B and 3C, as the circuit of FIG. 3D may be configured to operate in legacy mode, in P4 mode with embedded clock, or in P4 mode with a recovered clock signal. FIG. 3D includes an additional switch that may be configured to connect the output of comparator 320 to the clock input of data detector 360(c) (in P4 mode with embedded clock), or it can connect the CDR output to detector 360(c) (in P4 mode with recovered clock). As shown, the configuration circuit 340 is configured to provide an additional signal "P4 Mode Signal." In FIG. 3C, legacy and P4 had dedicated switch configurations for legacy and P4 modes, however in FIG. 3D the switch configurations within the two types of P4 operations may vary, depending on if an embedded subchannel clock is used or if the clock is recovered via CDR circuit 350. Thus the P4 Mode Signal may be configured to separately control switch configurations independently from the enable signal.

Figure 14:
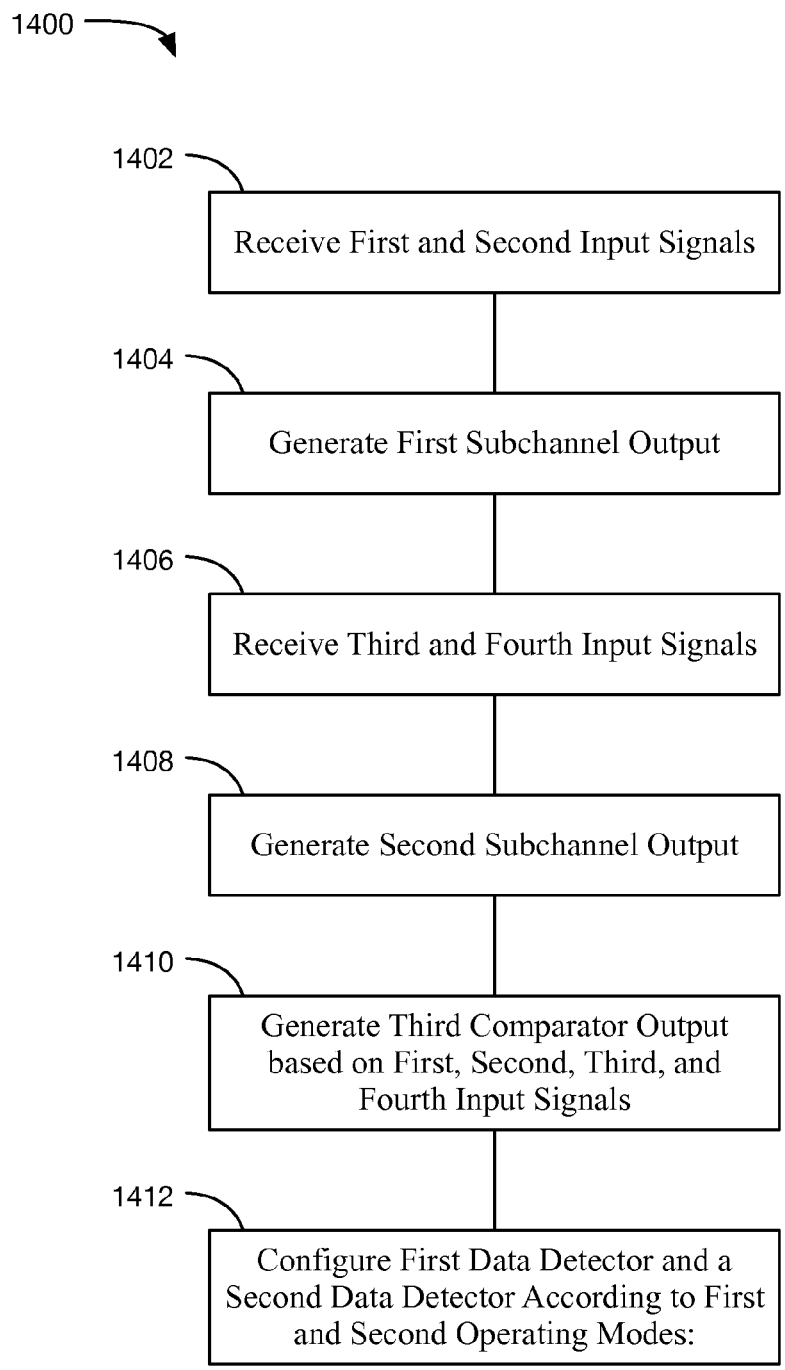
FIG. 14 is a flowchart of a process, in accordance with some embodiments.

FIG. 14 is a flowchart of a process, in accordance with some embodiments. As shown, method 1400 includes the steps of receiving, at step 1402, first and second input signals at a first two-input comparator, and responsively generating, at step 1404 a first subchannel output, receiving, at step 1406, third and fourth input signals at a second two-input comparator, and responsively generating, at step 1408, a second subchannel output, receiving the first, second, third, and fourth input signals at a third multi-input comparator, and responsively generating, at step 1410, a third subchannel output representing a comparison of an average of the first and second input signals to an average of the third and fourth input signals, configuring, at step 1412, a first data detector connected to the second subchannel output and a second data detector connected to the third subchannel output according to first and second operating modes: in the first operating mode, disabling the third comparator and the second data detector and communicating the first subchannel output to a clock input of the first data detector, and in the second operating mode, enabling the third comparator and communicating a clock signal to clock inputs of the first and second data detectors in a second operating mode.

In some embodiments, the clock signal is the first subchannel output. In some embodiments, the method further comprises generating the clock signal from the first, second, and third subchannel outputs using a clock recovery circuit. In such an embodiment, at least one of the first, second, and third subchannel outputs transitions, and the clock signal is generated according to the transition.

In some embodiments, disabling the multi-input comparator comprises using a processor, the processor comprising a register initialized indicating operation in the first operating mode.

In some embodiments, disabling the multi-input comparator comprises disconnecting the first, second, third and fourth input signals from the multi-input comparator.

In some embodiments, disabling the multi-input comparator comprises powering down the multi-input comparator.

In some embodiments, the first and second input signals correspond to a differential clock signal.

In some embodiments, the third and fourth input signals correspond to a differential data signal.

In some embodiments, the method further comprises decoding the first, second, and third subchannel outputs into a set of output data bits.

Detector Embodiments

Figure 2:
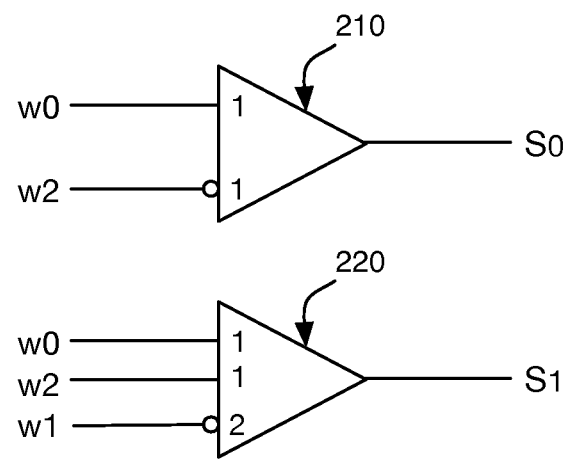
FIG. 2 illustrates an embodiment of the detector for P3 code.

An embodiment of the detector for the P3 code, as defined by the matrix of Eqn. 4 is shown in FIG. 2. The three input wires are w0 through w2, and the two subchannel outputs are S0 and S1. In the drawing convention used here, an inverted signal input to one of multi-input comparators 210 and 220 is represented by a bubble on the input wire, and the scaling factor (i.e. the relative proportion of contribution of one wire to the overall result) is shown by a numeric value within the comparator body at each wire input. Thus, for comparator 220, the w0 and w1 inputs each contribute one half to the positive value, while the w2 input contributes twice as much (e.g. the full amount) to the negative value.

An embodiment of the detector for the P4 code, as defined by the matrix of Eqn. 9 is shown in FIG. 3A. The four input wires are w0 through w3 and the three subchannel outputs are S0 through S2. In the drawing convention used here, an inverted signal input to one of multi-input comparators 310 through 330 is represented by a bubble on the input wire, and the scaling factor (i.e. the relative proportion of contribution of one wire to the overall result) is shown by a numeric value within the comparator body at each wire input.

Embodiments of the multi-input comparators of FIG. 2 and FIG. 3A may use the expanded differential pair design of [Holden I] or the alternative design of [Ulrich I]. In some embodiments, Continuous-Time Linear Equalization (CTLE) is also incorporated in the multi-wire comparator stage. Transistor-level schematics of such embodiments are shown in [Shokrollahi IV] and duplicated herein as FIGS. 4 through 8. Each design is shown both with and without integrated CTLE and where applicable, alternative embodiments are illustrated.

Figure 4:
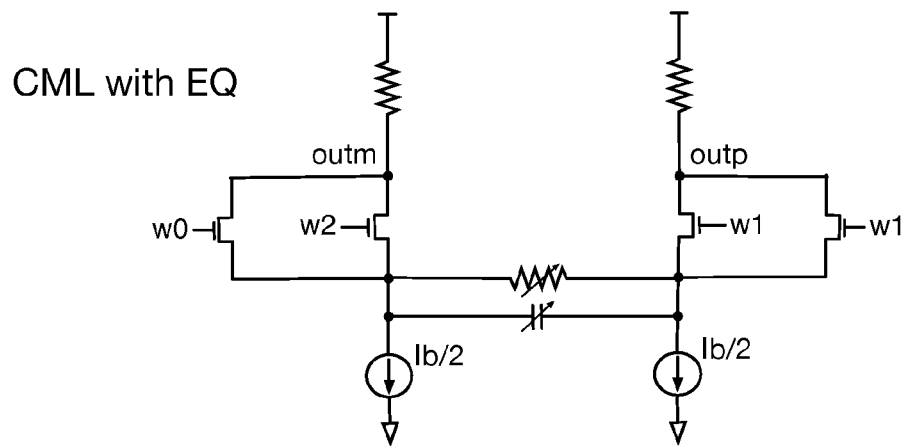
FIG. 4 is a schematic of one embodiment of a vector signaling code detector comparing three inputs with weights of one half, minus one, and one half.
Figure 4:
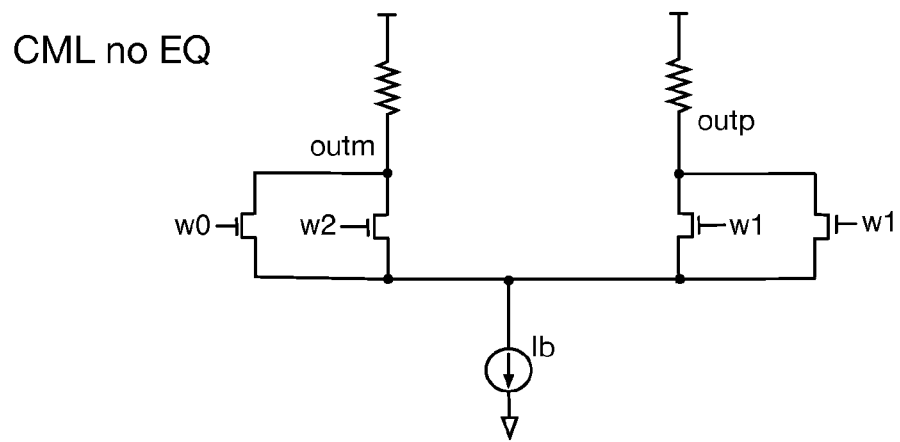
Figure 5:
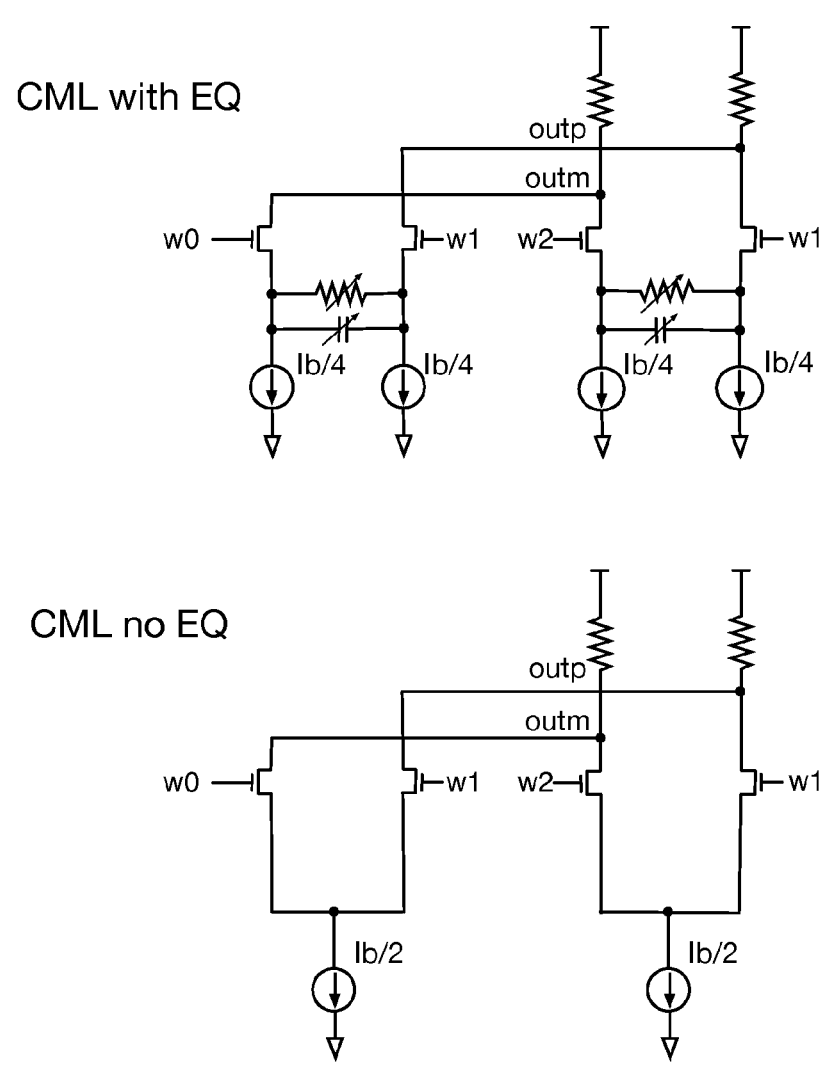
FIG. 5 is a schematic of an alternative embodiment of a vector signaling code detector comparing three inputs with weights of one half, minus one, and one half.
Figure 6:
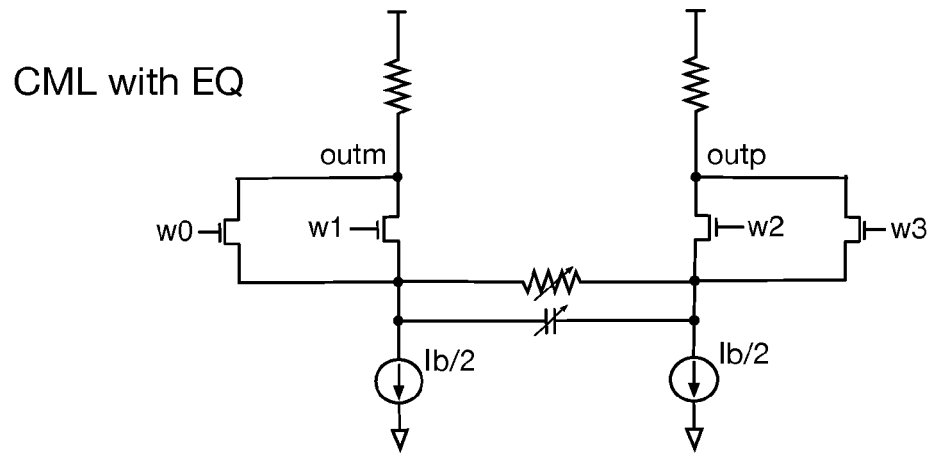
FIG. 6 is a schematic of one embodiment of a vector signaling code detector comparing four inputs with weights of one half, one half, minus one half, and minus one half.
Figure 6:
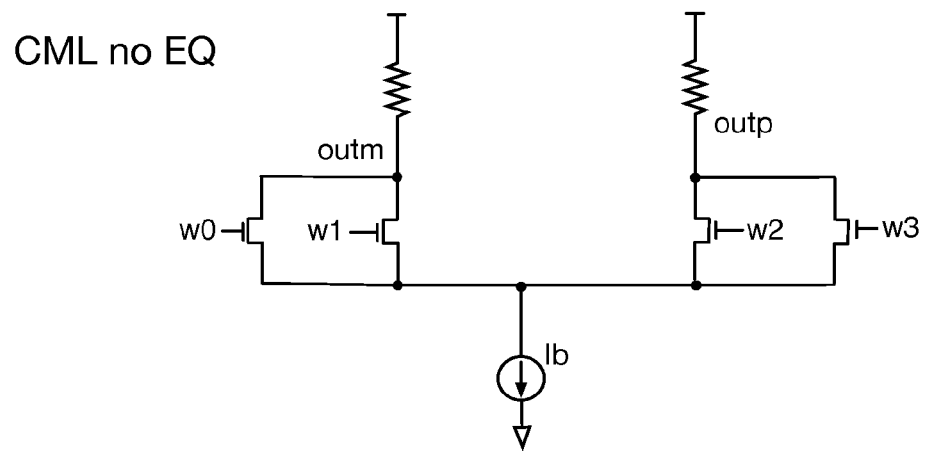
Figure 7:
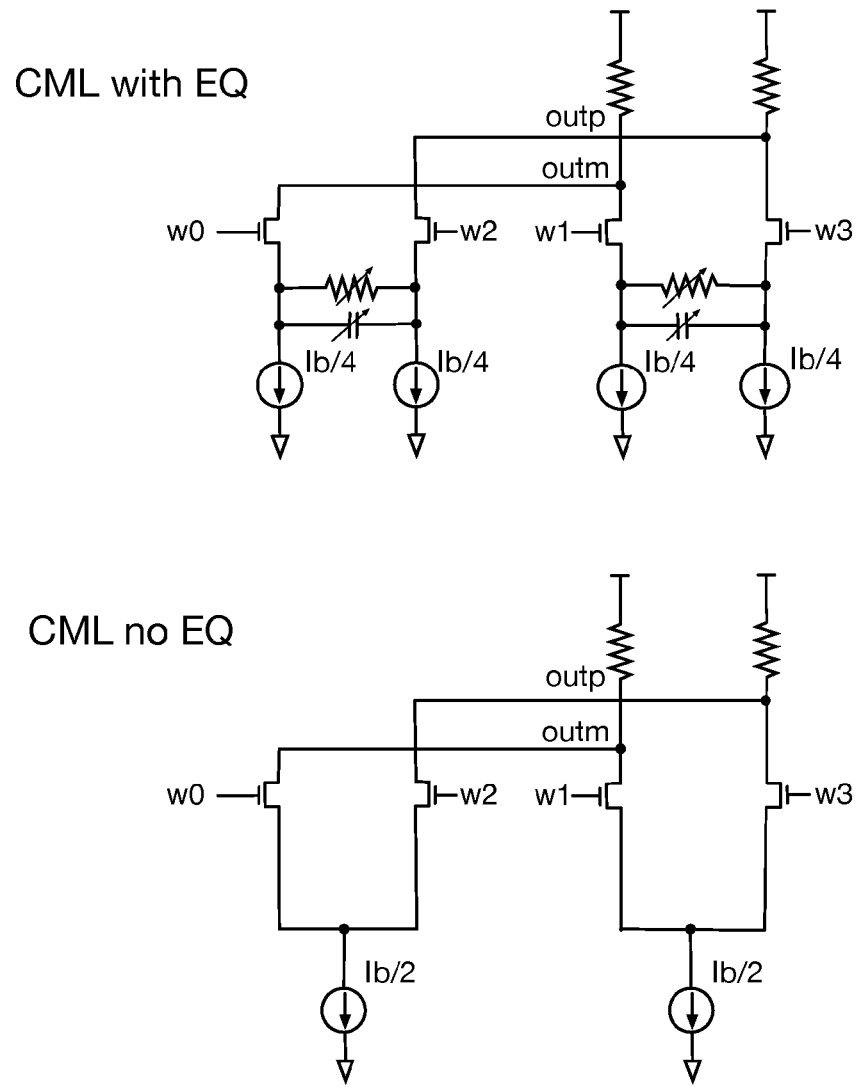
FIG. 7 is a schematic of an alternative embodiment of a vector signaling code detector comparing four inputs with weights of one half, one half, minus one half, and minus one half.
Figure 8:
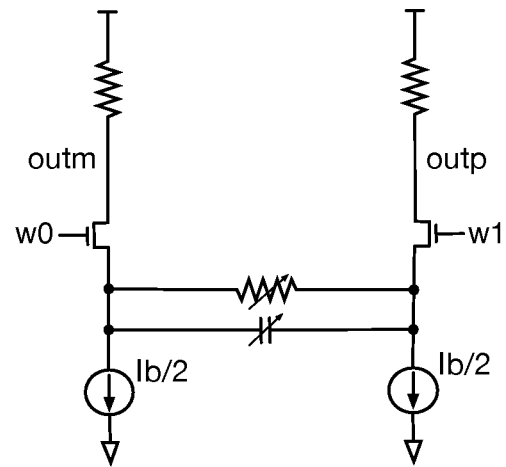
FIG. 8 is a schematic of one embodiment of a vector signaling code detector comparing two inputs with equal unity weights.
Figure 8:
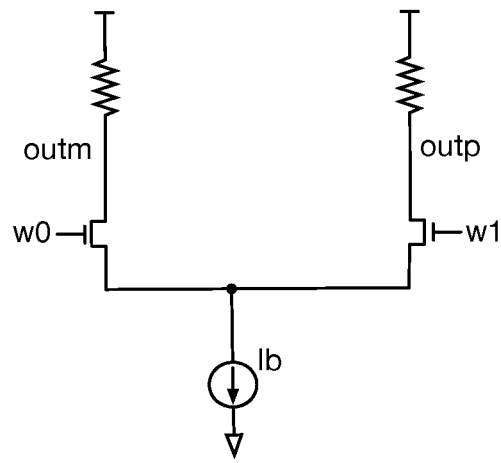

The design of FIG. 4 or its alternative embodiment of FIG. 5 is suitable for use as comparator 220 of FIG. 2. The design of FIG. 6 or its alternative embodiment of FIG. 7 is suitable for use as comparator 310 of FIG. 3A. The designs of FIG. 8 are suitable for used as comparator 310 of FIG. 3A, and with the obvious substitution of inputs, for use as comparator 320 of FIG. 3A and comparator 210 of FIG. 2.

In general, Decision Feedback Equalization (DFE) techniques are not required in typical P3 Code or P4 Code embodiment, where the channel length is typically small and signal propagation characteristics good. No limitation is implied, however, as DFE and other known art methods may be combined in a straightforward manner with the described embodiments.

Transmitter Embodiment

Figure 9:
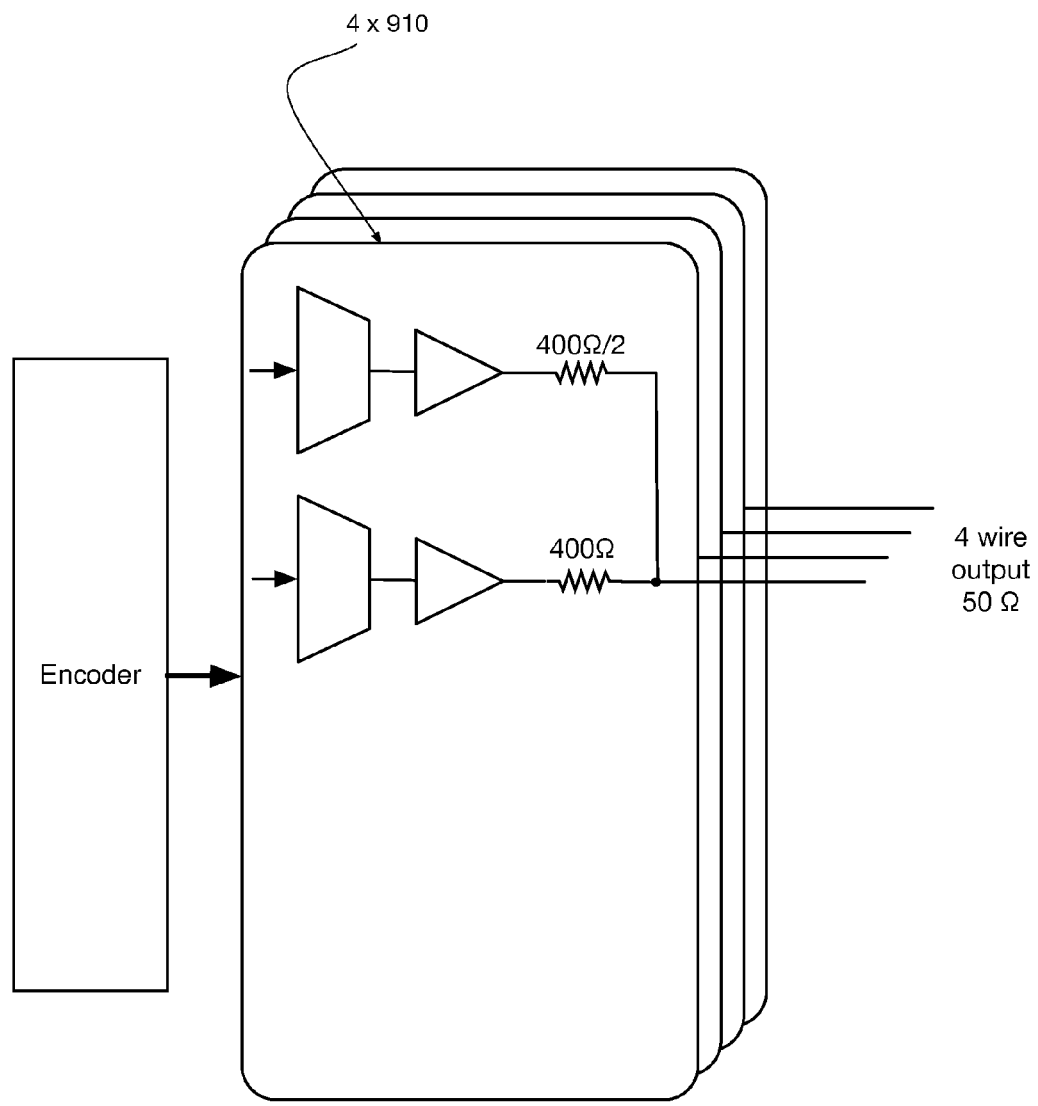
FIG. 9 is a block diagram of one embodiment of a transmission line driver suitable for use with a vector signaling code.

A variety of known art solutions may be applied to a vector signaling code transmitter in accordance with described embodiments, depending on the specific characteristics of the communications channel and the process used for fabricating the semiconductor devices. Extremely short and/or moderate data rate channels may utilize high impedance "CMOS-like" point-to-point interconnections, which are optimally driven using conventional voltage-mode drivers. Higher speed and/or longer channels having matched impedance terminations may preferably be driven using resistive source terminated or current-mode drivers. One example of a resistive source terminated driver for the P4 Code is shown in FIG. 9.

Three discrete signal levels must be generated by the transmitter, representing the codeword alphabet of +1, 0, and −1 symbols. Larger alphabets may be utilized as previously described for optimization P3 Code receive channel gain by utilizing modified modulation values, at the cost of additional transmitter complexity.

Known transmission driver equalization techniques such as Finite Impulse Response filtering may be combined with the described embodiments, as may be required by the particular channel characteristics and system design goals of the embodiment.

The examples presented herein illustrate the use of vector signaling codes for point-to-point communications. For purposes of descriptive simplicity, communications channels are described as collections of unidirectional wire signals. However, this should not been seen in any way as limiting the scope of the described embodiments. When combined with known art methods, the described channel direction may reverse in a half-duplex manner, or additional channel wires may be provided to support full duplex operation between integrated circuit devices. Multiple instances of the described interface may be utilized by an embodiment in an essentially parallel manner to support wider data transfer operations and/or higher communications throughput. Similarly, the methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

We claim:

1. An apparatus comprising:
   a first simple two-input comparator configured to receive first and second input signals, and to responsively generate a first subchannel output;
   a second simple two-input comparator configured to receive third and fourth input signals, and to responsively generate a second subchannel output; and
   a third multi-input comparator configured to receive the first, second, third, and fourth input signals, and to responsively generate a third subchannel output;
   a first data detector connected to the second subchannel output;
   a second data detector connected to the third subchannel output;

a configuration circuit configured to disable the third comparator and the second data detector in a first operating mode and to communicate the first subchannel output to a clock input of the first data detector, and to enable the third comparator and communicate a clock signal to clock inputs of the first and second data detectors in a second operating mode.

2. The apparatus of claim 1, wherein the clock signal is the first subchannel output.

3. The apparatus of claim 1, further comprising a clock recovery circuit configured to generate the clock signal from the first, second, and third subchannel outputs.

4. The apparatus of claim 3, wherein at least one of the first, second, and third subchannel outputs transitions, and the clock signal is generated according to the transition.

5. The apparatus of claim 1, wherein the configuration circuit disables the multi-input comparator using a processor, the processor comprising a register initialized indicating operation in the first operating mode.

6. The apparatus of claim 1, wherein the configuration circuit is configured to disconnect the first, second, third and fourth input signals from the multi-input comparator.

7. The apparatus of claim 1, wherein the configuration circuit is configured to disable to the multi-input comparator by powering down the multi-input comparator.

8. The apparatus of claim 1, wherein the first and second input signals correspond to a differential clock signal.

9. The apparatus of claim 1, wherein the third and fourth input signals correspond to a differential data signal.

10. The apparatus of claim 1, further comprising a decoder configured to decode the first, second, and third subchannel outputs into a set of output data bits.

11. A method comprising:
receiving first and second input signals at a first two-input comparator, and responsively generating a first subchannel output;
receiving third and fourth input signals at a second two-input comparator, and responsively generating a second subchannel output; and
receiving the first, second, third, and fourth input signals at a third multi-input comparator, and responsively generating a third subchannel output representing a comparison of an average of the first and second input signals to an average of the third and fourth input signals; and
configuring a first data detector connected to the second subchannel output and a second data detector connected to the third subchannel output according to first and second operating modes:
in the first operating mode, disabling the third comparator and the second data detector and communicating the first subchannel output to a clock input of the first data detector; and
in the second operating mode, enabling the third comparator and communicating a clock signal to clock inputs of the first and second data detectors in a second operating mode.

12. The method of claim 11, wherein the clock signal is the first subchannel output.

13. The method of claim 11, further comprising generating the clock signal from the first, second, and third subchannel outputs using a clock recovery circuit.

14. The method of claim 13, wherein at least one of the first, second, and third subchannel outputs transitions, and the clock signal is generated according to the transition.

15. The method of claim 11, wherein disabling the multi-input comparator comprises using a processor, the processor comprising a register initialized indicating operation in the first operating mode.

16. The method of claim 11, wherein disabling the multi-input comparator comprises disconnecting the first, second, third and fourth input signals from the multi-input comparator.

17. The method of claim 11, wherein disabling the multi-input comparator comprises powering down the multi-input comparator.

18. The method of claim 11, wherein the first and second input signals correspond to a differential clock signal.

19. The method of claim 11, wherein the third and fourth input signals correspond to a differential data signal.

20. The method of claim 11, further comprising decoding the first, second, and third subchannel outputs into a set of output data bits.

* * * * *